(12) United States Patent
Witty et al.

(10) Patent No.: US 7,784,707 B2
(45) Date of Patent: Aug. 31, 2010

(54) ENVIRONMENTAL CONDITION MONITORING OF A CONTAINER

(75) Inventors: Eric J. Witty, New Prague, MN (US); Peter A. Thayer, Richfield, MN (US); Brett A. Landrum, Burnsville, MN (US); Dennis A. Quy, Apple Valley, MN (US)

(73) Assignee: Xata Corporation, Burnsville, MN (US)

( * ) Notice: Subject to any disclaimer, the term of this patent is extended or adjusted under 35 U.S.C. 154(b) by 1085 days.

(21) Appl. No.: 11/436,381

(22) Filed: May 18, 2006

(65) Prior Publication Data

US 2007/0267509 A1 Nov. 22, 2007

(51) Int. Cl.
| | |
|---|---|
| *G05D 23/00* | (2006.01) |
| *B60H 1/32* | (2006.01) |
| *B60H 1/00* | (2006.01) |
| *G01M 1/38* | (2006.01) |
| *G05B 13/00* | (2006.01) |
| *G05B 15/00* | (2006.01) |
| *F25B 49/00* | (2006.01) |
| *G01K 13/00* | (2006.01) |

(52) U.S. Cl. .................. 236/51; 236/91 C; 236/94; 700/276; 62/127; 62/129; 62/131

(58) Field of Classification Search ............... 62/127, 62/129, 131; 700/276; 236/51, 91 C, 94
See application file for complete search history.

(56) References Cited

U.S. PATENT DOCUMENTS

| | | | |
|---|---|---|---|
| 4,234,926 A | 11/1980 | Wallace et al. | |
| 4,879,877 A | 11/1989 | Hicke | |
| 4,882,912 A | 11/1989 | Fossey | |
| 4,885,564 A | 12/1989 | Vercellotti et al. | |
| 4,896,277 A | 1/1990 | Vercellotti et al. | |
| 4,936,104 A | 6/1990 | Hicke | |
| 5,032,821 A | 7/1991 | Domanico et al. | |
| 5,101,643 A | 4/1992 | Hicke | |
| 5,172,321 A | 12/1992 | Ghaem et al. | |
| 5,488,352 A | 1/1996 | Jasper | |
| 5,677,667 A | 10/1997 | Lesesky et al. | |
| 5,907,491 A | 5/1999 | Canada et al. | |
| 5,913,180 A | 6/1999 | Ryan | |
| 6,003,322 A | 12/1999 | Graham | |
| 6,064,299 A | 5/2000 | Lesesky et al. | |

(Continued)

OTHER PUBLICATIONS

Peter H. Anderson, "DS1820 Digital Thermometer—Calculating an 8-bit CRC Value," Jun. 1998, 8 pages.

(Continued)

*Primary Examiner*—Thomas E Denion
*Assistant Examiner*—Michael Carton
(74) *Attorney, Agent, or Firm*—Shumaker & Sieffert, P.A.

(57) ABSTRACT

In an embodiment, the invention is directed to a device including an environmental condition sensor, a light sensor; and a control module. The control module associates a light intensity above a defined threshold with an open-door status of a container. In another embodiment, a device includes an environmental condition sensor, a rewriteable memory that stores environmental condition data from the environmental condition sensor, and a wireless communication module that transmits stored environmental condition data. Embodiments of the invention may be useful to provide techniques for monitoring environmental conditions within a container, such as a refrigerated trailer.

15 Claims, 6 Drawing Sheets

U.S. PATENT DOCUMENTS

| | | | |
|---|---|---|---|
| 6,131,399 A * | 10/2000 | Hall | 62/127 |
| 6,138,580 A | 10/2000 | Thoman | |
| 6,182,006 B1 | 1/2001 | Meek | |
| 6,349,257 B1 | 2/2002 | Liu et al. | |
| 6,411,203 B1 | 6/2002 | Lesesky et al. | |
| 6,475,585 B1 * | 11/2002 | Yamanashi et al. | 428/40.1 |
| 6,608,554 B2 | 8/2003 | Weant et al. | |
| 6,619,055 B1 | 9/2003 | Addy | |
| 6,625,584 B1 | 9/2003 | Bains et al. | |
| 6,633,809 B1 | 10/2003 | Aizono et al. | |
| 6,681,987 B1 | 1/2004 | Ford | |
| 6,737,962 B2 | 5/2004 | Mayor | |
| 6,744,352 B2 | 6/2004 | Lesesky et al. | |
| 6,789,391 B2 | 9/2004 | Graham et al. | |
| 6,844,829 B2 | 1/2005 | Mayor | |
| 6,863,222 B2 | 3/2005 | Slifkin et al. | |
| 6,917,801 B2 | 7/2005 | Witte et al. | |
| 6,922,558 B2 | 7/2005 | Delp et al. | |
| 6,946,953 B2 | 9/2005 | Lesesky et al. | |
| 7,015,800 B2 | 3/2006 | Lesesky et al. | |
| 7,212,889 B2 | 5/2007 | Mann et al. | |
| 2002/0000092 A1 * | 1/2002 | Sharood et al. | 62/127 |
| 2003/0109218 A1 | 6/2003 | Pourkeramati et al. | |
| 2003/0164754 A1 * | 9/2003 | Roseen | 340/309.16 |
| 2004/0176127 A1 * | 9/2004 | Ballantyne et al. | 455/552.1 |
| 2005/0033848 A1 | 2/2005 | Croome | |
| 2007/0090965 A1 | 4/2007 | Mc Call | |
| 2007/0214812 A1 * | 9/2007 | Wagner et al. | 62/129 |

OTHER PUBLICATIONS

Xata Fleet Intelligence:: Products:: Onboard fleet management systems that integrate onboard computers, GPS tracking, mobile communications, and driver management software, Xata Corporation, www.xata.com/fleet-communications.html, 2005, 2 pages.

Ember's EM250 ZigBee system-on-a-chip now shipping, Ember Corporation, Mar. 1, 2006, 3 pages.

Compact Integrated Antennas Application Note, Design and Applications for the MC1319x, MC1320x, and MC1321x, Freescale Semiconductor, Inc., Document No. AN2731, Rev. 1.3, Jan. 2006, 26 pages.

Joerg Bertholdt, "Designing wireless sensor network applications," Portable Design™, http://pd.pennnet.com, Mar. 2006, 5 pages.

ZigBee Specification, ZigBee Document 053474r06, Version 1.0, ZigBee™ Alliance, Jun. 27, 2005, 378 pages.

* cited by examiner

| ACTUAL CONDITIONS | | | RECORDED DATA | | |
|---|---|---|---|---|---|
| Reading | Temp. | Time | Count | Door Status | Delta |
| 1 | -10 | 0:00 | 0 | 1 | 0 |
| 2 | -10 | 0:05 | -- | -- | -- |
| 3 | -11 | 0:10 | 2 | 1 | -1 |
| 4 | -10 | 0:15 | 3 | 1 | 1 |
| 5 | -9 | 0:20 | 4 | 1 | 1 |
| 6 | -9 | 0:25 | -- | -- | -- |
| 7 | -9 | 0:30 | -- | -- | -- |
| 8 | -9 | 0:35 | -- | -- | -- |
| 9 | -9 | 0:40 | 0 | 1 | 0 |
| 10 | -10 | 0:45 | 1 | 1 | -1 |
| 11 | -8 | 0:50 | 2 | 1 | 2 |
| 12 | -6 | 0:55 | 3 | 1 | 2 |
| 13 | -6 | 1:00 | -- | -- | -- |
| 14 | -6 | 1:05 | -- | -- | -- |
| 15 | -6 | 1:10 | 6 | 0 | 0 |
| 16 | -6 | 1:15 | -- | -- | -- |
| 17 | -6 | 1:20 | 0 | 0 | 0 |
| 18 | -8 | 1:25 | 1 | 0 | -2 |
| 19 | -8 | 1:30 | -- | -- | -- |
| 20 | -15 | 1:35 | 3 | 0 | -7 |
| 21 | -7 | 1:40 | 4 | 0 | 8 |
| 22 | -9 | 1:45 | 5 | 0 | -2 |
| 23 | -10 | 1:50 | 6 | 0 | -1 |
| 24 | -10 | 1:55 | -- | -- | -- |
| 25 | -11 | 2:00 | 0 | 0 | -1 |

FIG. 4

ENVIRONMENTAL CONDITION MONITORING OF A CONTAINER

TECHNICAL FIELD

The invention relates to environmental condition monitoring of a container, and more particularly, but without limitation, to monitoring the internal temperature within a refrigerated shipping container.

BACKGROUND

Many goods need to be stored and transported within controlled environments to preserve the value of those goods. For example, many food products need to be kept within particular temperature and/or humidity ranges during storage and transport in order to prevent decay and maintain freshness. However, the freshness of food is not readily determinable or precisely determinable during storage or transport. Unfresh or decayed food may be discovered only upon use. Because it is difficult to evaluate the condition of food and other goods during storage and transport, if deteriorated goods are discovered it may be difficult to determine when or how such goods deteriorated. For example, in the case of deteriorated shipped goods, it may not be possible to determine if the goods were packed in a deteriorated condition, if they deteriorated during storage and prior to shipping, if they deteriorated at some point during shipping or if they deteriorated after delivery to their destination.

Often times shipping companies receive the blame for deteriorated goods regardless of fault. Some customers prefer to know environmental conditions of their goods during storage and transport to ensure that goods arrive in the same condition in which the goods were shipped. Additionally, knowledge of a storage temperature history allows a customer to either extend or reduce a product's permitted shelf life. For these and other reasons, some shipping companies use systems that document controlled environments of storage and/or shipping containers used while goods are in possession of the shipping company. This way, a shipping company can not only confirm or refute accusations regarding deteriorated goods, but can also provide increased value to customers by demonstrating proper storage of goods within specified environmental conditions.

SUMMARY

In general, the invention relates to environmental condition monitoring. For example, in some embodiments of the invention, an environmental condition monitor may measure and record an ambient air temperature within a container at periodic intervals. The environmental condition monitor may also take and record additional measurements in combination with the temperature measurement.

For example, a monitoring unit may measure light coincidentally with periodic temperature measurements. A light sensor may be useful to determine if an enclosed area, for example a shipping container, has been opened. In the example of a shipping container, sensing light is generally useful way to determine whether the container had been opened, because workers generally need light in order to load and unload the container.

A light sensor may be useful to provide context to another environmental condition measurement. For example, a sharp increase in temperature of a refrigerated container, such as a refrigerated tractor-trailer (commonly referred to as a reefer), may signal a problem with the refrigeration unit for the container, or alternatively, the increase in temperature may simply be the result of the container being opened, e.g., for loading and unloading. A simple measurement from a light sensor can distinguish between these two situations. Such a determination may be useful, for example, in determining whether or not to issue an alert. A light sensor may be equally useful in combination with other sensors of environmental conditions. For example, a light sensor may be useful in combination with humidity or pressure sensors.

Some embodiments of the invention allow for environmental condition data of a shipping container to be sent over preexisting communication systems. For example, some preexisting driver communication systems allow a semi truck driver to send and receive route information over one or more of a variety of networks, such as a satellite network, a cellular network, or a private wireless network. In some cases, a driver may carry a physical memory card between a network access point and the driver communication module in the cab of a semi truck.

An environmental condition monitor may include a wired or wireless connection to a network access point, such as a driver communication module. In some embodiments, an environmental condition monitor may use the same wireless connection protocol to communicate with the driver communication module as the driver communication module uses to communicate with the network. The driver communication module, a network access point, can forward environmental condition information to the driver or to other locations on the network as needed. In this manner, embodiments of the invention may allow for a simple an inexpensive device that piggybacks on existing information systems to provide historical and current environmental conditions for an environmentally controlled shipping container.

In one embodiment, the invention is directed to a device comprising an environmental condition sensor, a rewriteable memory to store environmental condition data from the environmental condition sensor, and a wireless communication module to transmit stored environmental condition data.

In another embodiment, the invention is directed to a device comprising an environmental condition sensor, a light sensor, and a control module, wherein the control module associates a light intensity above a defined threshold with an open-door status of a container.

In another embodiment, a method comprises measuring an internal temperature within a container, measuring light intensity within the container, and upon measuring a light intensity above a defined threshold, associating such a measurement with an open door of the container.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a chart illustrating a set of actual environmental conditions and corresponding set of recorded data that provides a condensed data storage format for the actual environmental conditions.

DETAILED DESCRIPTION

Figure 1:
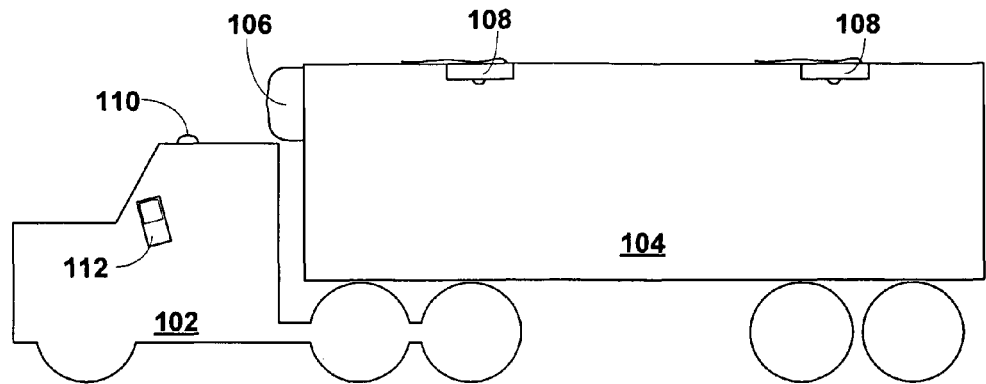
FIG. 1 illustrates a semi truck including a refrigerated trailer with two wireless environmental condition monitors.

FIG. 1 illustrates semi truck 102 and refrigerated trailer 104. Semi truck 102 includes driver communication module 112, which includes antenna 110. Refrigerated trailer 104 includes refrigeration unit 106 and two wireless environmental condition monitors 108. Environmental condition monitors 108 measure and transmit environmental condition data from within refrigerated trailer 104 to driver communication module 112. Environmental condition monitors 108 provide redundant monitoring of refrigerated trailer 104.

Environmental condition monitors 108 each include thermometers to monitor the ambient temperature within refrigerated trailer 104. Environmental condition monitors 108 also include light sensors to detect when a door of refrigerated trailer 104 has been opened. Light sensors are useful to detect when a door has been opened because ambient light from the sun generally illuminates the interior of trailer 104 when the door is opened. Moreover, even if the door is opened at night, workers who load or unload good can be expected to use lighting directed inside trailer 104 in order see the inside of trailer 104. Detecting when a door of refrigerated trailer 104 has been opened is useful to distinguish between a change in temperature due to a malfunction of refrigeration unit 106 or due to an open door.

Environmental condition monitors 108 provide environmental condition data from within refrigerated trailer 104 to driver communication module 112. More specifically, in this embodiment, environmental condition monitors 108 provide temperature and light condition data to driver communication module 112. Environmental condition monitors 108 may transmit environmental condition data to driver communication module 112 periodically, only upon a change in environmental conditions, to report a condition outside defined limits, or using any combination of these techniques. Other techniques for transmitting environmental condition data are also possible.

Environmental condition monitors 108 may be battery powered or wired into a power source of refrigerated trailer 104. Environmental condition monitors 108 also include external antennas to communicate wirelessly with driver communication module 112. Environmental condition monitors 108 allow for easier installation than embodiments providing environmental condition monitors that communicate via a wired connection or require a wired power supply. Additionally, if the power to refrigerated trailer 104 is interrupted, environmental condition monitors 108 using battery power wound remain operable. For this reason is may be useful to include a battery back-up for embodiments in which environmental condition monitors 108 are wired into a power source of refrigerated trailer 104.

Environmental condition monitors 108 may communicate with driver communication module 112 using a transmission protocol that uses low power consumption. For example, environmental condition monitors 108 may communicate with driver communication module 112 using a ZigBee wireless standard. Using a ZigBee wireless standard, environmental condition monitors 108 may consume less than 1 microampere of power, or even less than 0.5 microamperes of power, during a single transmission to a network access point. Once driver communication module 112 has environmental condition data, it may report the data to a driver, transmit the data to a centralized network, record the data in memory, process the data to determine if an alert is necessary, perform a combination of these operations or perform a different operation.

Environmental condition monitors 108 can be installed into in-service containers, such as refrigerated trailer 104. Environmental condition monitors 108 have a low profile, such that as installed on an inside surface of refrigerated trailer 104, environmental condition monitors 108 do not substantially interfere with storage space within refrigerated trailer 104. For ease of installation, environmental condition monitors 108 may include an adhesive pad that allows environmental condition monitors 108 to be fixed inside refrigerated trailer 104. The external antennas of environmental condition monitors 108 mount on the outside of refrigerated trailer 104. To reach the outside of refrigerated trailer 104, installation of environmental condition monitors 108 requires a small hole. For example, an installer may drill a one-eighth inch to one-quarter inch hole to facilitate connecting the external antennas to antenna jacks of environmental condition monitors 108.

Figure 2:
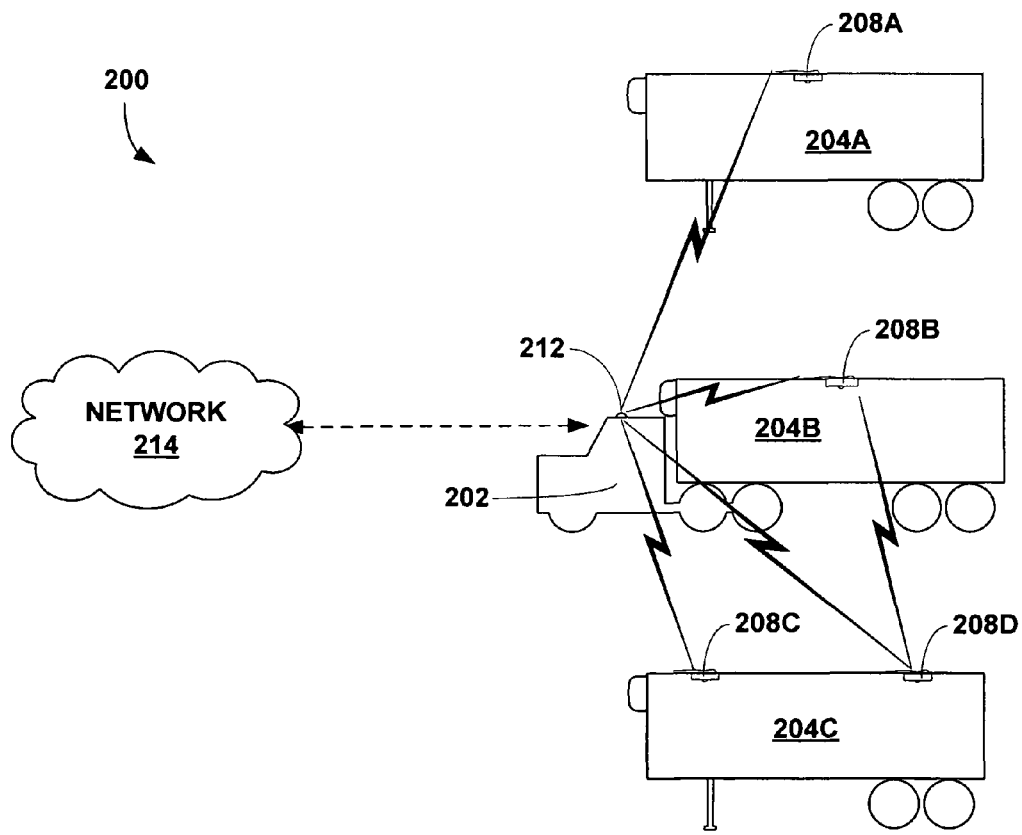
FIG. 2 illustrates exemplary communication between multiple wireless environmental condition monitors and a single driver communication module.

FIG. 2 is a block diagram illustrating system 200, which provides exemplary communication paths between wireless environmental condition monitors 208A-208D (environmental condition monitors 208) and driver communication module 212. Each of environmental condition monitors 208 can communicate with a network access point of any driver communication module 212 and any other compatible driver communication module within the system 200. This is provides a way to retrieve data from environmental condition monitors within refrigerated trailers that are not attached to a semi truck, or are attached to a semi truck that does not include a compatible driver communication module. For example, while refrigerated trailer 204B is attached to semi truck 202, refrigerated trailers 204A and 204C are not attached to semi truck 202. However, each of environmental condition monitors 208A-208D can communicate environmental condition data to driver communication module 212 of semi truck 202.

Environmental condition monitors 208 may transmit environmental condition data to driver communication module 212 at periodic intervals. In other embodiments, environmental condition monitors 208 may transmit environmental condition data only upon a change in environmental conditions, to report a condition outside defined limits or anytime environmental condition data is available and driver communication module 212 is in range. Some embodiments may provide for a combination of these techniques. Other techniques for transmitting environmental condition data are also possible.

Each environmental condition monitors 208 may include a unique serial number to identify itself during a transmission to a network access point, such as driver communication module 212. Similarly, driver communication module 212 may use the unique serial numbers to address a specific environmental condition monitor 208, for example, to acknowledge a receipt of a transmission or to send configuration information to a particular one of environmental condition monitors 208.

Once driver communication module 212 has received environmental condition data from one or more of environmental condition monitors 208, driver communication module 212 forwards the data to one or more computers on network 214 using techniques currently used to transmit route information and other data from driver communication module 212 via network 214. In this manner, environmental condition data regarding refrigerated trailers 204A-204C is transmitted to one or more computers on network 214 using a preexisting communication interface of driver communication module 212 on network 214. For example, driver communication module 212 may send and receive route information or other data over one or more of a variety of networks, such a satellite, cellular, private wireless or even via physical memory cards hand-carried between a network access point and the driver communication module in the cab of a driver's truck.

In other embodiments, environmental condition monitors 208 may communicate with network access points that are not part of a driver communication module. For example, an area where refrigerated trailers are often parked may include a network access point to communicate with driver communication modules and environmental condition monitors. In other embodiments, the parking area for refrigerated trailers may include a network access point dedicated to communication with environmental condition monitors. As a different example, environmental condition monitors may communicate directly with a shared network access point, such as a cellular tower. However, using a shared network to communicate directly with environmental condition monitors may have undesirable consequences, such as additional power consumption by environmental condition monitors, which may limit battery life. In addition, another undesirable consequence of using a shared network may be added costs, e.g., for subscription to the shared network.

As shown with respect to environmental condition monitors 208B and 208D, environmental condition monitors may forward environmental condition data to each other to This technique is commonly referred to as meshing. Generally speaking, meshing is the ability to "bounce" messages from one unit to another until it reaches an access point. Environmental condition monitors 208 may use meshing to extend range and reduce transmission power requirements. For example, even though environmental condition monitor 208D may be in range of driver communication module 212, it may send environmental condition data to environmental condition monitor 208B instead to conserve battery power. Environmental condition monitor 208B would then forward the environmental condition data from environmental condition monitor 208D to driver communication module 212. Even though meshing requires extra transmission steps, it may lead to a net conservation of battery power among environmental condition monitors 208 because of the exponential relationship between wireless transmission distance and signal strength at that a distance. For example, doubling a wireless transmission distance may require increasing signal strength at a wireless transmission source by a factor of eight to produce the same signal strength at the transmission destination.

Regardless of the technique used to deliver environmental condition data from environmental condition monitors 208 to one or more computers on network 214, network 214 provides centralized oversight of a plurality of environmental condition monitors. For example, environmental condition data available over network 214 may be useful to oversee a fleet of vehicles. Various computers on network 214 may communicate with a fleet of semi trucks, each including a driver communication module. In this way, network 214 can allow a remote user (connected to a computer on network 214) to organize, sort and otherwise process environmental condition information from a plurality of environmental condition monitors, including environmental condition monitors 208. Because the described embodiment allows for available environmental condition information to be current, depending on techniques used for transmitting environmental condition data from driver communication module 212 over network 214, a remote user may be able to take responsive action to mitigate the effect of undesirable environmental conditions reported by environmental condition monitors.

Figure 3A:
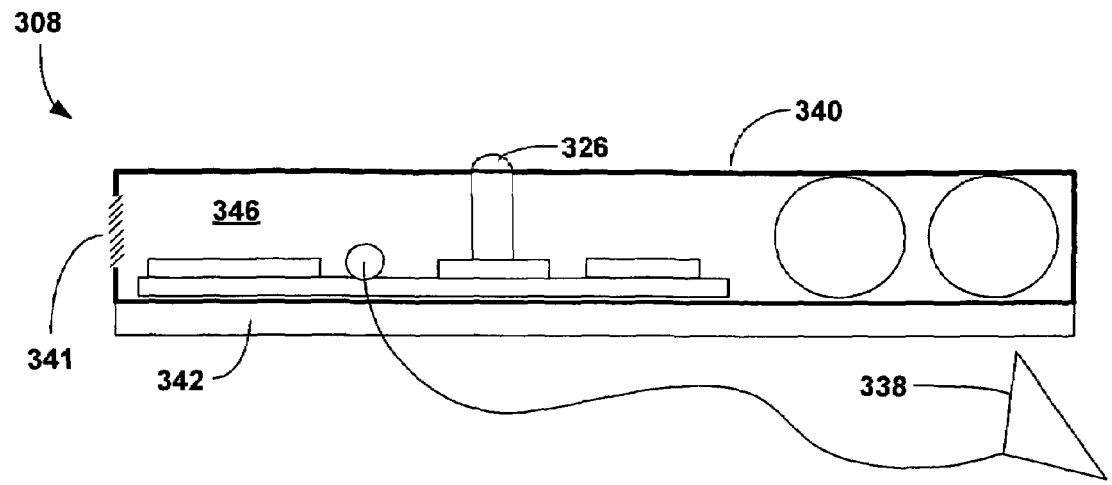
FIGS. 3A-3B illustrate an exemplary embodiment of a battery-powered wireless environmental condition monitor.
Figure 3B:
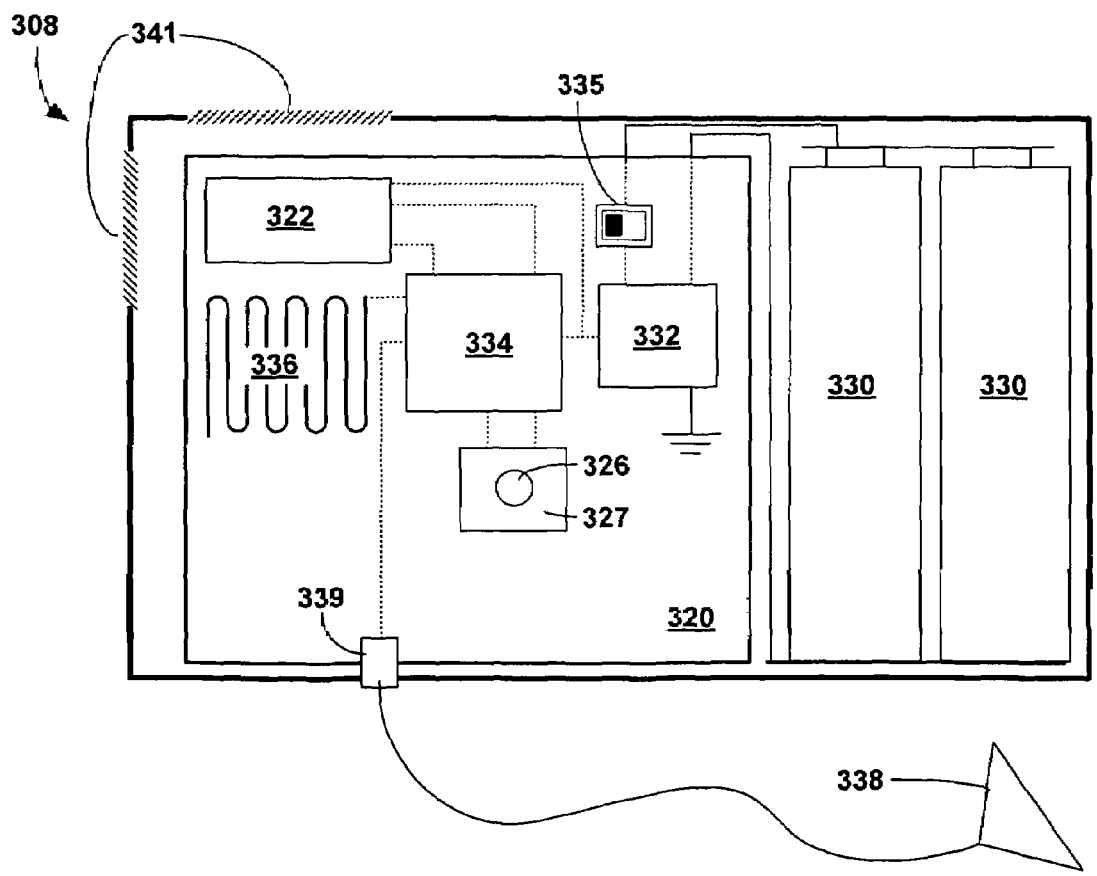

FIGS. 3A-3B illustrate environmental condition monitor 308. For example, environmental condition monitor 308 may correspond to environmental condition monitors 108 in FIG. 1 and/or environmental condition monitors 208 in FIG. 2. Environmental condition monitor 308 includes thermometer 322, light sensor 326, and control module 334, each of which are mounted to printed circuit board 320. The power supply system for environmental condition monitor 308 includes batteries 330, on/off switch 335 and voltage regulator 332. Environmental condition monitor 308 also includes a wireless communication capability, provided in-part by one or both of internal antenna 336 and external antenna port 339. External antenna 338 is connected to external antenna port 339.

The physical design of environmental condition monitor 308 has a low-profile suitable for mounting inside of a container. Adhesive pad 342, which is connected to external housing 340 of environmental condition monitor 308, allows environmental condition monitor 308 to be easily attached to a solid surface, for example, the inside of a refrigerated trailer. Furthermore, environmental condition monitor 308 has a robust design. For example, housing 340 physically protects internal components from impacts. While housing 340 includes slots 341 to allow ambient air to circulate over thermometer 322, circuit board 320 has a conformal coating to protect the electronic components from humidity and other corrosive conditions.

The design of environmental condition monitor 308 allows for simple installation and operation of environmental condition monitor 308. For example, because environmental condition monitor 308 operates on power from batteries 330, no power cabling is necessary for installation. Additionally, because environmental condition monitor 308 communicates wireless via one or both of internal antenna 336 and external antenna 338, environmental condition monitor 308 requires no cabling in order to operate.

Control module 334 operates each of the other electronic components in environmental condition monitor 308. As an example, control module 334 may include an EM250 ZigBee system-on-a-ship (SoC) available from Ember Corporation of Boston, Mass. The EM250 chip includes a programmable microprocessor, a 2.4 GHz radio, a network protocol stack, memory including 5 kilobytes of RAM and 128 kilobytes of rewriteable flash memory, and operating system software. In other embodiments, control module 334 may include a different chip and/or separate and distinct components.

Environmental condition monitor 308 takes periodic temperature measurements using thermometer 322, which relays measurements to control module 334. In other embodiments, thermometer 322 may only communicate with control module 334 if a specified event occurs, such as a measurement outside predefined limits. However, in the embodiment illustrated in FIGS. 3A-3B, thermometer 322 includes a real-time clock module to provide relative time stamping of the temperature measurements. Control module 334 may use the real time clock included with thermometer 322 to poll thermometer 322 at the specified periodic intervals. As one example, thermometer 322 may include a DS1629 digital thermometer available from Maxim Integrated Products, Incorporated of Sunnyvale, Calif. The DS1629 digital thermometer includes a real-time clock and communicates through a two wire interface.

Environmental condition monitor 308 can send an alert to warn if a measured temperature is outside acceptable limits. For example, if mounted in a refrigerated trailer as shown in FIG. 2, environmental condition monitor 308 may immediately send an alert to driver communication module 212, which may then inform the driver of the alert and forward the alert to network 214. Environmental condition monitor 308 generally enters a sleep mode between the periodic temperature measurements to conserve battery power. If a temperature outside acceptable limits is detected, environmental condition monitor 308 may periodically attempt to transmit the alert to a network access point in addition to taking the periodic temperature measurements when not in sleep mode.

Environmental condition monitor 308 also takes a light reading using light sensor 326 simultaneously or near simultaneously with every temperature reading taken. Light sensor 326 is operable at low temperatures, for example at temperatures to approximately −20 degrees Celsius. Light sensor 326 is paired with operational amplifier 327 to deliver signals to control module 334. In other embodiments, operational amplifier 327 may not be required. Light readings allow environmental condition monitor 308 to record a door status of a container such as a refrigerated trailer, which has near zero light when the door is closed. Using a light sensor rather than a mechanical door sensor reduces cost, complexity, and installation time. For example, to distinguish an open-door, wavelength sensitivity of light sensor 326 may part of the visible spectrum, e.g., from 600 nm to 1100 nm. As one example, light sensor 326 may be a lead base silicon daylight filter detector. Lead base silicon daylight filter detectors are available from Advanced Photonix, Incorporated.

Environmental condition monitor 308 may record the status of a door of a container as one bit to represent open or closed. Environmental condition monitor 308 may need to be initially calibrated to identify an appropriate ambient light level. However, in similar containers, calibration from one container may apply to each of the containers such that calibration is not required for installation of environmental condition monitor 308 for every container. The threshold light level for determining a door open status may be implemented in light sensor 326 and/or operational amplifier 327 such that operational amplifier 327 may output a digital value to control module 334. In other embodiments, control module 334 may evaluate an analog signal to determine if a light level within a container indicates a door open status or a door closed status.

Control module 334 communicates to a network access point using one or both of internal antenna 336 and external antenna port 339. Internal antenna 336 may be printed directly on circuit board 320 and may have a size of 1.2 square centimeters or less. External antenna 338 may be an optional add-on to environmental condition monitor 308 in order to increase the communication range of environmental condition monitor 308. As one example, external antenna 338 may be a folded-F antenna.

Internal antenna 336 provides an alternative means of data transmission relative to external antenna 338. Internal antenna 336 is particularly suited for transmissions with unimpeded communication paths. For example, internal antenna 336 may be used for communication between two environmental condition monitors within the same shipping container. In this case, if just one of the environmental condition monitors included an external antenna, the other environmental condition monitor within the container could communicate through a network access point via the environmental condition monitors with the external antenna. This would simplify installation of multiple environmental condition monitors within a single container because only a single hole in the shipping container would be required to connect to an external antenna mounted on the outside of the shipping container.

As another example, environmental condition monitor 308 could be used only to track and identify a shipping container, e.g., environmental condition monitoring features of environmental condition monitor 308 may be disabled. In such a case, environmental condition monitor 308 may be mounted on the outside of the shipping container, and internal antenna 336 would be sufficient to allow communication with a network access point. Furthermore, internal antenna 336 may be used to transmit a signal from inside a shipping container to a network access point outside the container. However, this would require a stronger transmission signal and consume more battery power than required for communication via external antenna 338 if external antenna 338 is mounted on the outside of a shipping container.

The power supply system for environmental condition monitor 308 includes batteries 330, on/off switch 335 and voltage regulator 332. On/off switch 335 is provided to prevent discharge of batteries 330 prior to installation of environmental condition monitor 308 within a container. Once monitor 308 is installed, housing 340 may prevent access to on/off switch 335. Alternatively, on/off switch 335 could be made more accessible, and could be used to prolong battery life if measurements from environmental condition monitor 308 are not required for extended periods of time.

The power source of environmental condition monitor 308 is provided by batteries 330, which may be, for example, lithium-ion batteries, containing a total power of about 4800 milliampere-hours. Batteries 330 each produce approximately 3.6 total volts and are connected in parallel to maintain the voltage of a single battery. Other battery configurations may also be used for environmental condition monitor 308.

Batteries 330 connect through on/off switch 335 to voltage regulator 332. Voltage regulator 332 is connected to a ground plane of circuit board 320 and provides power to control module 334 and thermometer 322. Light sensor 326 may be a passive sensor, not requiring power or may receive power indirectly via control module 334. In other embodiments, voltage regulator 332 may provide power directly to light sensor 326.

Environmental condition monitor 308 provides a long battery life. For example, in embodiments where environmental condition monitor 308 samples and records a temperature and a door status every five minutes, transmits stored environmental condition data every half hour, and sleeps for the remainder of the time, batteries 330 may provide an expected battery life of approximately 3 years.

In addition to providing temperature and door status information, environmental condition monitor 308 is also capable of performing self-diagnostics and transmitting the results of the self diagnostics to a network access point. For example, environmental condition monitor 308 may perform self-diagnostic tests periodically, such as daily, or upon receiving an external request to perform diagnostics. Exemplary self-diagnostics may include one or more tests of whether thermometer 322 has a short to ground, whether thermometer 322 has a short to open, whether thermometer 322 has an intermittent short, whether thermometer batteries 330 are providing a low voltage (which would indicate that batteries 330 may be in need of replacement), and/or whether wireless transmission circuitry and software is working properly.

FIG. 4 is a chart illustrating a set of actual environmental conditions and corresponding set of recorded data that provides a condensed format for the actual environmental conditions. FIG. 4 includes sequential readings labeled 1 through 25. Next to each of the sequential readings under the heading "Actual Conditions" is a corresponding distinct temperature and time interval for the readings. Adjacent to the "Actual Conditions" heading is the heading "Recorded Data". Information under the "Recorded Data" heading signifies data that was actually recorded in memory corresponding to the actual conditions data and includes a count, door status and a delta. While the door status may properly be shown under both the "Actual Conditions" and the "Recorded Data" headings, for simplicity it is only shown under the "Recorded Data" heading.

Not shown in FIG. 4 is a recorded data heading that includes a distinct time and temperature corresponding to reading number 1. Because the recorded data heading includes a distinct time and temperature for reading number 1, data for readings 2-25 can be recorded simply by storing changes relative to a most-recent previously recorded reading rather than using distinct values. This allows storage of temperature and door status information using less memory than required to store distinct values.

Because periodic measurements are taken every five minutes, the actual time a measurement is taken is not required, but instead represented as a count. The count represents the interval number of a data reading and may range from 0 to 7, inclusive. Because the count is limited to the numbers 0 to 7, it can always be recorded using only three bits.

As shown, e.g., for readings 2, 6, 7 and 8, data is not recorded for each reading. Instead data is only recorded for a reading if one or more of the following occurs: there is a change in temperature (represented as "delta" in FIG. 4), there is a change in door status and/or the count is 0. Because data is recorded every time the count is 0, the number prior readings with a count of zero can be used to determine the actual time interval for recorded data. The sequentially recorded data uses the header as a reference point and provides a time, a door status, and a temperature for each reading even though there is no recorded data for many of the readings.

As shown in FIG. 4, the door status is recorded using a single bit and signifies door closed (1) or door open (0). The door status is derived from a measured light level. In other embodiments, a representation of the measured light level may be recorded instead of simply door closed (1) or door open (0). However, this would require additional bits in the door status information to represent various levels of light intensity.

Delta represents a change in temperature since the most recent data recording. For example, looking at reading number 20, the distinct temperature is −15 degrees Celsius. Because this is seven degrees less than the most recent recorded data of −8 degrees Celsius, which corresponds to reading number 18, delta for reading number 20 is recorded as −7.

In one embodiment, delta is generally represented to the nearest one degree Celsius using four bits. This provides an available range of a total of sixteen possible deltas. In some embodiments, a range of more than sixteen may be required to properly represent delta. In such instances where this commonly occurs, more than four bits may be used to represent delta. Another possibility is to record a new reader that includes the absolute temperature whenever delta is outside the available range. As an alternative, instead of a range of sixteen, e.g., from −7 to 8, delta may be represented as a single bit to signify positive or negative and three bits to represent the magnitude of the delta. This provides a range of only fifteen (−7 to −0 combined with 0 to 7), but allows an indication that more bits are required to show delta. For example, if the total memory requirement for a single reading is usually a single byte consisting of three bits for the count, one bit for the door and four bits for the delta, a value of −0 for the delta may be used to signify that the next entire byte will represent the actual delta relative to the most recent previously recorded temperature or temperature delta. In this manner, the memory requirement to store a reading when the magnitude of delta is seven or less remains only one byte, but allows the magnitude of delta to be as large as $2^7=128$ by using one additional byte for that reading.

For example, reading number 21 shows a delta of 8. This reading may be represented using two bytes. The first byte may be "100 1 0 000". In this example, the first three bits represent a count of 4, the fourth bit represents a door closed, the fifth bit represents a negative delta and the last three bits represent the magnitude of the delta. However, in this first byte, the delta is negative with a magnitude of zero, which indicates that the next byte is used to represent the actual delta. In this case, the second byte used to represent reading number 21 may be "1 001000", with the first bit representing a positive delta and the last seven representing a delta magnitude of 8. This data structure is merely exemplary as many other arrangements and bit assignments could be defined within the scope of the current disclosure.

Figure 5:
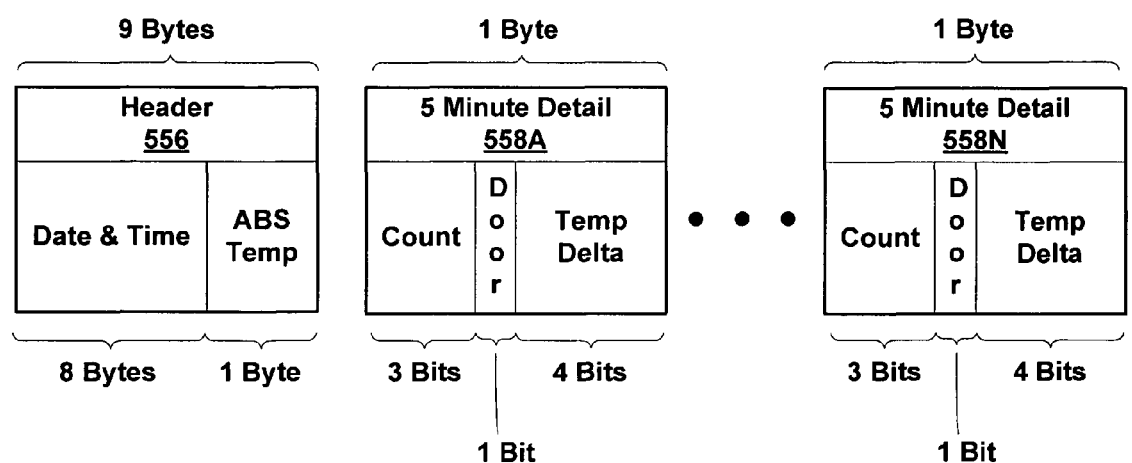
FIG. 5 illustrates an exemplary data structure for storing and transferring environmental condition data.

FIG. 5 illustrates an exemplary data structure for storing and transferring environmental condition data. For example, the data structure shown in FIG. 5 may be used to format the recorded data shown in FIG. 4. The data structure begins with header 556 and also includes a plurality of 5-minute detail data recordings 558A-559N (data recordings 558).

Header 556 includes a date and time stamp representing the actual time of data recording 558A. The date and time stamp of header 556 may require 8 bytes of memory. Paired with the date and time stamp of header 556 is a discrete temperature for data recording 558A. Because the discrete temperature in header 556 represents the most recent data recording prior to data recording 558A, the temperature delta of data recording 558A will be 0.

As described with respect to FIG. 4, data recordings 558 each consist of a single byte with three bits allocated to represent a count, one bit to represent a door status and four bits to represent a temperature delta relative to the most recent previously recorded temperature or temperature delta.

Using ZigBee wireless protocol, data is transferred in 64-byte packets. In addition to the bytes shown in the data structure of FIG. 5, some of the bytes may be allocated for non-data purposes. For example, each packet may include a 1-byte message header, an identifier of the message source and type, a 1-byte unsigned length value of the data in the packet, and a 1-byte CRC (cyclic redundancy check). It may be useful to record a new header (9 bytes) at the beginning of every 64-byte increment. Discounting these bytes provides approximately 50 bytes per packet for environmental condition data recordings 558, which provides approximately four hours worth of data per 64-byte increment. However, an environmental condition monitor may need to record more than four hours worth of data between transmissions to a network access point.

For example, an environmental condition monitor, e.g., environmental condition monitor 308 from FIG. 3, may attempt to transfer data at periodic intervals, such as every thirty minutes. However, a network access point may not be available every thirty minutes. The environmental condition monitor may need to store a recorded environmental condition data in memory for a much longer period of time. As described with respect to FIG. 3, the EM250 chip includes 5 kilobytes of RAM and 128 kilobytes of rewriteable flash memory. Of this, 20 kilobytes of rewriteable flash memory may be allocated to store environmental condition data. 20 kilobytes provides room to store more than 300 64-byte increments, which corresponds to approximately 50 days of temperature and door status data recorded at five minute intervals. This greatly exceeds the expected time an environmental condition monitor may need to store environmental condition data between data transmissions to a network access point. In other embodiments, environmental condition monitors may include less available memory, but still provide sufficient data storage to store environmental condition data between data transmissions to a network access point.

Figure 6:
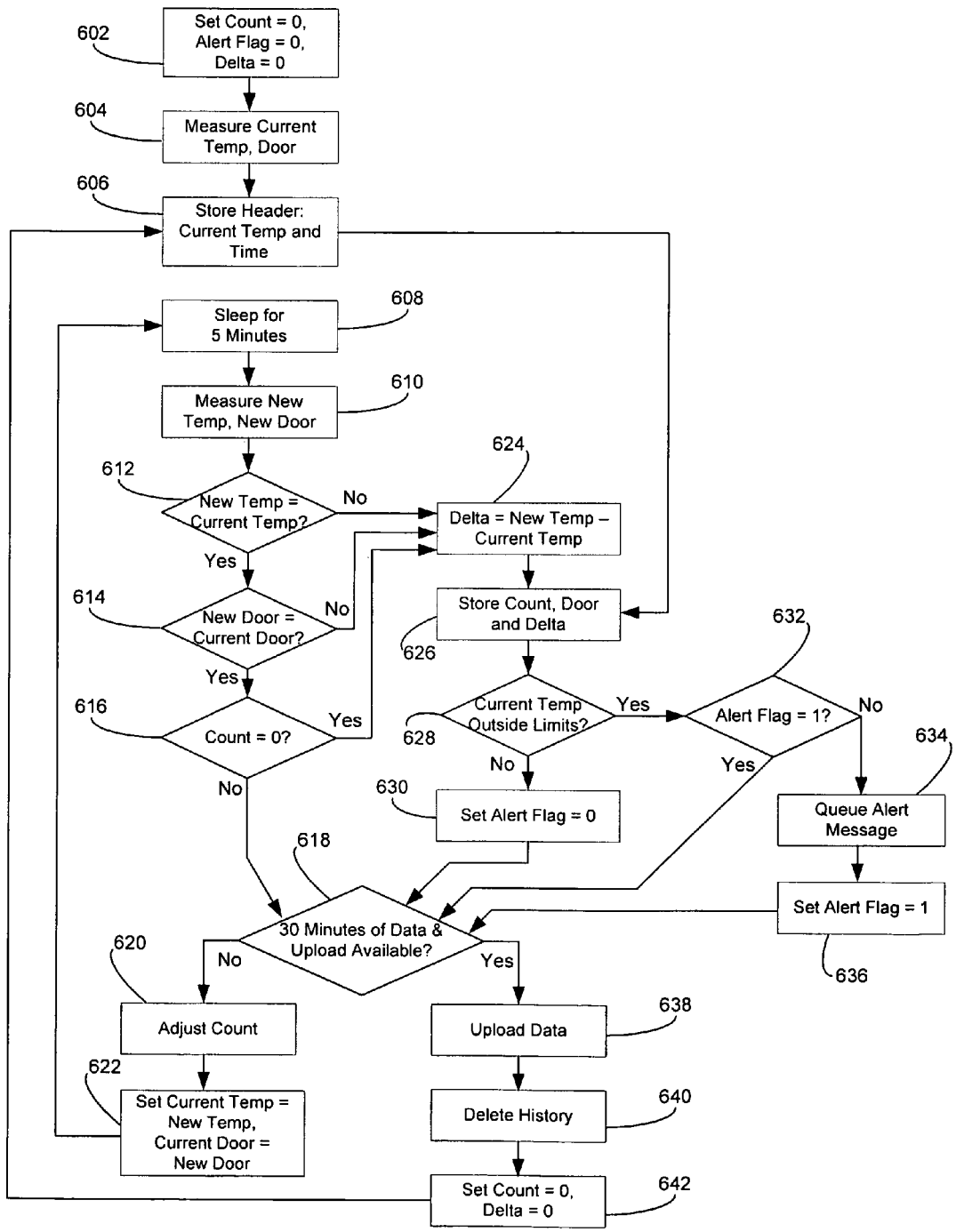
FIG. 6 is a flowchart illustrating an exemplary control program for an environmental condition monitor.

FIG. 6 is a flowchart illustrating an exemplary control program for an environmental condition monitor. For example, the control program shown in FIG. 6 may be used by an environmental condition monitor to implement the data storage techniques shown in FIG. 4 and FIG. 5. For purposes of clarity the control program shown in FIG. 6 is described with reference to environmental condition monitor 308 and control module 334 from FIG. 3.

In the initial step of environmental condition monitoring, for example, after an initial power-on, a battery replacement or a forced system reset, control module 334 sets operational variables: count=0, alert flag=0 and delta=0 (602). Next, control module 334 immediately measures a current temperature and determines a current door status (604). Control module 334 then stores a header including the discrete current temperature and time (606). After storing a header, control module 334 stores the first data recording, which includes the count of 0, the current door status of either door closed (1) or door open (0) and the delta of 0.

Control module 334 then determines if a temperature alert is necessary. For example, a temperature alert may be necessary if the current temperature is outside defined limits (628). If the current temperature is not outside defined limits, control module 334 sets the alert flag to 0 (630). If the current temperature is outside defined limits, control module checks to see if the alert flag is equal to 1 (632). If the current temperature is outside defined limits and the alert flag is not currently equal to 1, control module 334 queues an alert message (634). Control module 334 then sets the alert flag to 1 (636). By checking to determine if the alert flag is equal to 1, control module 334 only operates to queue and transmit an alert message only once for each time the temperature goes beyond outside defined limits. Once an alert message is queued control module 334 periodically attempts to transmit the alert to a network access point such as an available driver communication module. After transmission, the alert is removed from the queue. In the event a network access point can not be found, control module 334 periodically attempts to transmit the alert to a network access point. The interval between attempted alert transmissions may be based on the sleep cycles and power constraints of environmental condition monitor 308. For example, control module 334 may attempt to transmit the alert every 30 minutes. As another example, control module 334 may attempt to transmit the alert every time environmental condition monitor 308 wakes to take an environmental condition measurement. Control module 334 may store more than one alert in queue, but limit the number of alerts allowed in the queue. For example, control module 334 may limit queued alerts to the first ten alerts. Alerts after the first ten alerts in queue may be discarded.

After determining if a temperature alert is necessary and queuing an alert if in fact temperature alert is necessary, control module 334 then looks to see if at least 30 minutes of environmental condition data is in memory and if a network access point is available to receive a transmission (618). For this first iteration, less than 30 minutes of environmental condition data is stored in memory. Therefore, control module 334 continues by adjusting the count by adding 1 to the previous count, which was 0 (620). After adjusting the count, the control module sets the current temperature to be equal to the most recent temperature measurement and the current door status to be equal to the most recent door status determination (622). For this first iteration, the current temperature and the current door status simply remain the same as measured in step 604.

After control module 334 sets the current temperature and the current door to be equal to the most recent measurements, environmental condition monitor 308 enters a sleep for five minutes to conserve battery power (608). After sleeping, environmental condition monitor 308 wakes up, and control module 334 measures a new temperature and a new door status. Control module 334 stores a data recording if at least one of the flowing conditions exists: the new temperature is different from the current temperature (612), the new door status is different from the current door status (614) or the count equals 0. If none of these conditions exist, control module 334 again looks to see if at least 30 minutes of environmental condition data is in memory and if a network access point is available to receive a transmission (618). However, if any of the above conditions do exist, control module 334 calculates a delta by subtracting the current temperature from the new temperature (624). In this instance, the name current temperature is a misnomer as it is five minutes old. However, for consistency in displaying the control program shown in FIG. 6 the term current temperature is used to label a temperature measurement set as the current temperature variable until it is changed in step 622 or step 606. After calculating a delta, control module 334 stores a data recording including the count, the new door and the delta. Once control module 334 stores the data recording, it then determines if a temperature alert is necessary as described previously with respect to steps 628, 630, 632, 634 and 636.

Control module 334 then looks to see if at least 30 minutes of environmental condition data is in memory and if a network access point is available to receive a transmission (618). If less than 30 minutes of environmental condition data is in memory or if no network access point is available, control module 334 adjusts the count (620). Specifically, control module 334 adjusts the count by adding 1 to the current count unless the count already equals 7, in which case control module 334 sets the count equal to 0. After adjusting the count, the control module sets the current temperature to be equal to the new temperature (the most recent temperature measurement) and the door status to be equal to the new door status (the most recent door status determination) (622). The process then repeats with step 608 as environmental condition monitor 308 enters a sleep for five minutes to conserve battery power as previously described.

Once at least 30 minutes of environmental condition data is in memory and a network access point is available, control module 334 uploads the data to the available network access point, such as a driver communication module (638). After uploading the environmental condition data, control module 334 deletes the environmental condition data stored in memory and sets operational variables of the count=0 and of the delta=0. Control module 334 begins the process again by storing a new heading header including the current temperature and time (606).

Figure 7:
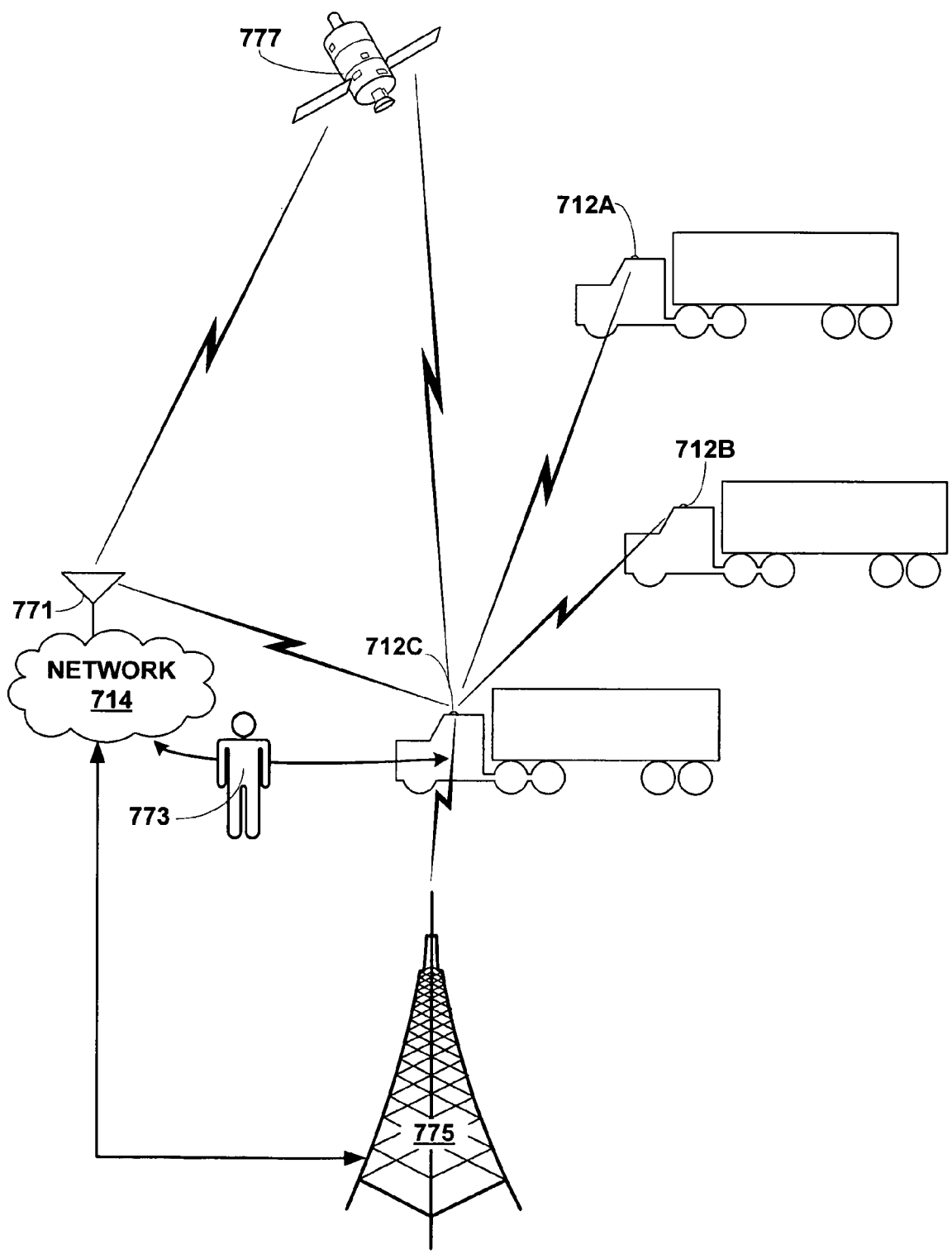
FIG. 7 illustrates exemplary techniques for transmitting environmental condition data from driver communication modules to a network.

FIG. 7 illustrates exemplary techniques for transmitting environmental condition data from driver communication modules 712A-712C (driver communication modules 712) to one or more computers on network 714. Environmental condition data received by driver communication modules 712 from environmental condition monitors (not shown in FIG. 7) may be forwarded via network 714 to facilitate oversight and data management for a fleet including a plurality of environmental condition monitors. Network 714 may be, for example, a private network such as an Ethernet network or a public network such as the Internet.

While each of driver communication modules 712 is substantially similar, for efficiency or other reasons, as shown in FIG. 7, environmental condition data from driver communication modules 712A and 712B is collected at driver communication module 712C. Driver communication module 712C forwards the environmental condition data from each of driver communication modules 712 to one or more computers on network 714. In other embodiments, each of driver communication modules 712 may communicate directly with one or more computers on network 714.

Driver communication module 712C may communicate over network 714 using one or more of the techniques shown in FIG. 7. For example, driver communication module 712C may communicate via cellular system 775, satellite system 777 or through a private wireless network 771. For example, private wireless network 771 may operate using a ZigBee wireless standard. As another example, data from driver communication module 712C may be hand-carried by driver 773 between driver communication module 712C and network 714 using flash memory or other recordable media.

Various embodiments of the invention have been described. Embodiments of the invention as described herein have focused on environmental condition monitors that measure temperature within refrigerated trailers. However, environmental condition monitors within the scope of the current invention may be used to measure environmental conditions other than temperature, such as humidity. Environmental condition monitors within the scope of the current invention may also be used in a variety of applications other than refrigerated trailers. Such applications include, but are not limited to, refrigerated boxcars, fixed refrigerators, and stationary storage areas, such as a wine cellar, coolers and others.

These and other embodiments are within the scope of the following claims.

The invention claimed is:

1. A device comprising:
   a temperature sensor;
   a light sensor;
   a rewriteable memory that stores environmental condition data including temperature data from the temperature sensor and indications of a door status of a container based on a light intensity measured by the light sensor;
   a wireless communication module that transmits the stored environmental condition data including temperature data and indications of the door status of the container; and
   a control module, wherein the control module reads a current temperature from the temperature sensor and a current light condition from the light sensor at periodic intervals, and at those periodic intervals in which at least one of the current temperature and the current light condition changes since a most-recent previous reading, the control module data records the current temperature and the current light condition as the environmental condition data in the rewriteable memory,
   wherein the control module issues an alert when a temperature reading is outside acceptable limits and the door status is a closed-door status, and the control module does not issue the alert when the temperature reading is outside acceptable limits and the door status is an open-door status.

2. The device of claim 1, wherein the wireless communication module includes an external antenna.

3. The device of claim 1, further comprising:
   a housing securing the temperature sensor and the rewriteable memory; and
   an adhesive on an external side of the housing that allows the device to be mounted on an object.

4. The device of claim 1, further comprising a battery that powers the device.

5. The device of claim 1, wherein the control module records the current temperature by storing a change in temperature since a most-recent previously recorded temperature.

6. The device of claim 1, wherein the control module determines if a network access point is available and transmits the environmental condition data to the network access point.

7. The device of claim 1, wherein the current temperature readings and the current light condition readings are taken at substantially the same time for each of the periodic intervals.

8. The device of claim 1, wherein the device transmits a unique identifier to allow identification of the device.

9. The device of claim 1, wherein the wireless communication module transmits data using a ZigBee wireless standard.

10. A device comprising:
    an environmental condition sensor that outputs an environmental condition signal representing an environmental condition measured by the environmental condition sensor;
    a light sensor that outputs a light intensity signal representing a light intensity measured by the light sensor; and
    a control module that receives the environmental condition signal and the light intensity signal,
    wherein the control module associates a light intensity above a defined threshold with an open-door status of a container,
    wherein the control module maintains a historical record of the environmental conditions measured by the environmental condition sensor and a door status of the container, and
    wherein the door status of the container is based on an evaluation of the light intensity signal received from the light sensor,
    wherein the control module issues an alert when a temperature reading is outside acceptable limits and the door status is a closed-door status, and the control module does not issue the alert when the temperature reading is outside acceptable limits and the door status is an open-door status.

11. The device of claim 10, wherein the container is a refrigerated trailer.

12. The device of claim 10, wherein the environmental condition sensor measures temperature.

13. The device of claim 12, further comprising a wireless communication module that transmits temperature measurements from the environmental condition sensor and the door status of the container.

14. The device of claim 10, further comprising a rewriteable memory that stores the historical record of the environmental conditions measured by the environmental condition sensor and the door status of the container.

15. The device of claim 10, wherein the door status of the container in the historical record can be either open-door status or a closed-door status.

* * * * *